Nov. 7, 1933. J. W. DAVISON ET AL 1,934,487
POWER SYSTEM MORE PARTICULARLY FOR MARINE PROPULSION
Filed Jan. 3, 1931 3 Sheets-Sheet 3
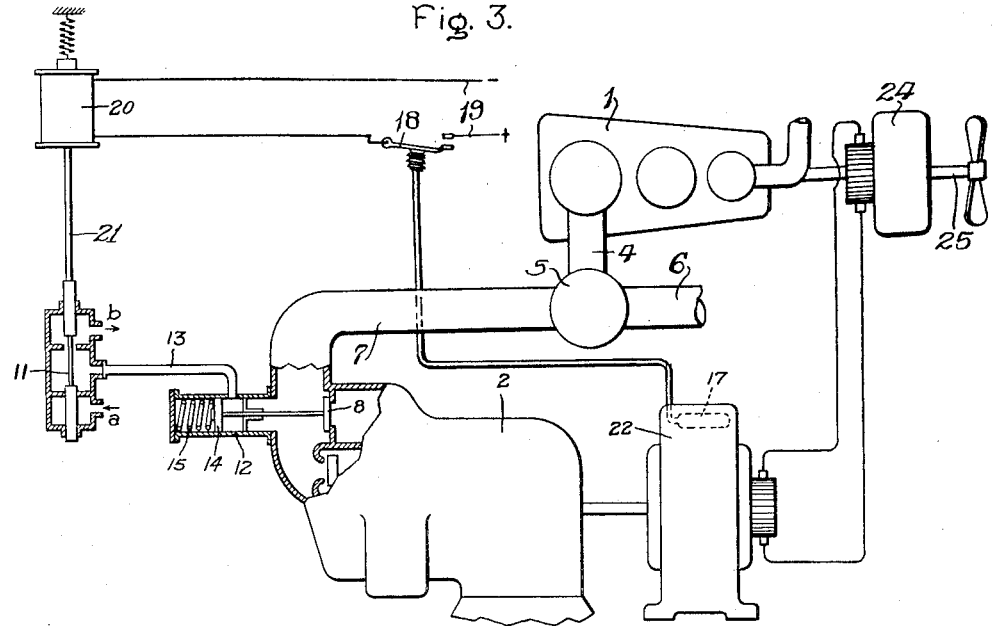
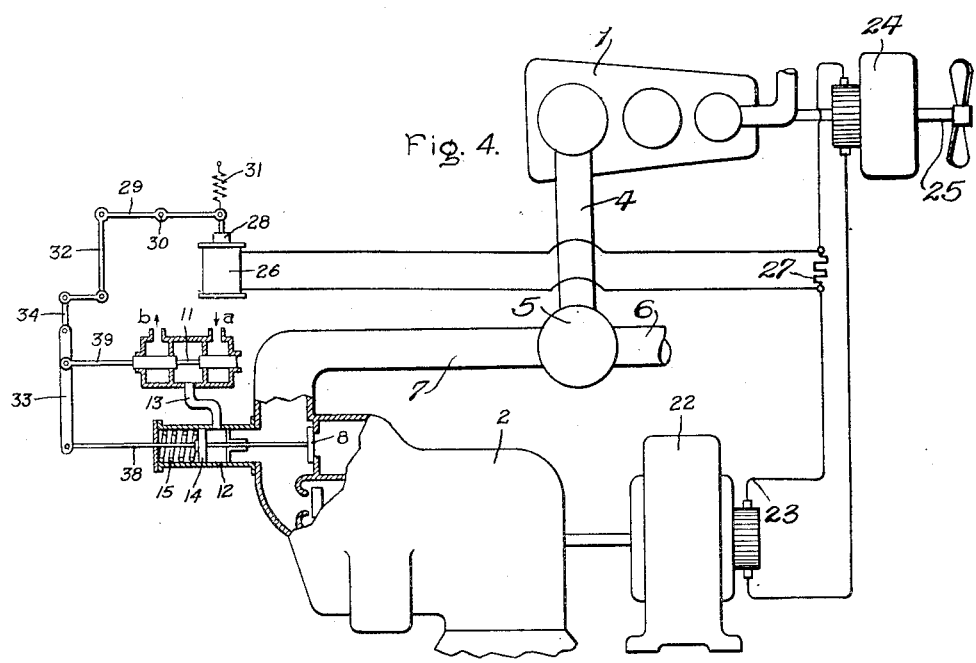
Inventors:
James W. Davison,
Gerald W. Higgs-Walker,
Eric M. Johnson,
by Charles E. Mullen
Their Attorney.

Patented Nov. 7, 1933

1,934,487

UNITED STATES PATENT OFFICE 1,934,487

POWER SYSTEM MORE PARTICULARLY FOR MARINE PROPULSION

James Weir Davison, Whitefield, and Gerald Whitehouse Higgs-Walker, Kingswinford, near Dudley, and Eric Maurice Johnson, Brooklands, England, assignors to General Electric Company, a corporation of New York Application January 3, 1931, Serial No. 506,478, and in Great Britain January 6, 1930

9 Claims. (Cl. 60—21)

Our invention relates to power systems in which a load device is operated by a reciprocating engine and a turbine which is connected to the exhaust of the reciprocating engine. Our invention is particularly applicable to ship propulsion.

It is an object of our invention to provide means responsive to load conditions on the turbine for reducing the ratio of power developed by the turbine to the power developed by the reciprocating engine.

Further objects of our invention will become apparent from a consideration of the following description taken in connection with the accompanying drawings.

In the accompanying drawings Fig. 1 is a diagram illustrating how the invention may be carried into practical effect.

Fig. 3 is a diagram illustrating the method of controlling a similar valve by thermostatic means, and Fig. 4 is a diagram showing how a similar valve can be controlled in accordance with the load output of the turbine.

Figure 1:
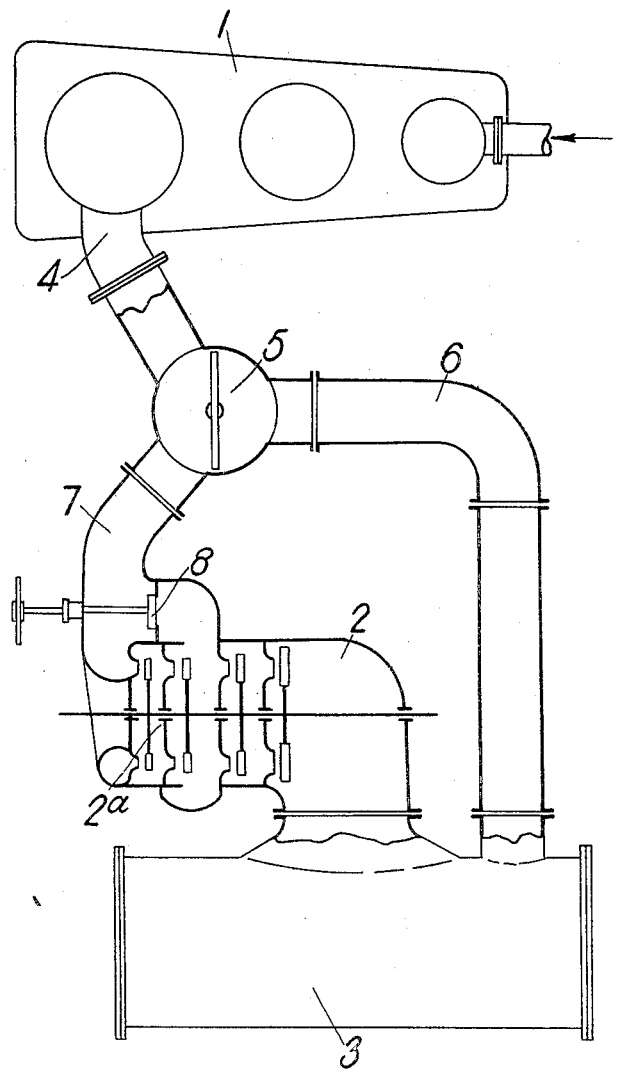

Referring now to Fig. 1, the exhaust outlet 4 of a reciprocating engine 1 is connected to a two-way main by-pass valve 5 whereby the steam may be delivered either to a multistage turbine 2 from whence it passes to a condenser 3, or direct to the condenser 3 by means of a branch 6. The branch 7 of the two-way valve 5 has provided therein a valve 8 whereby part of the steam passing to the turbine 2 may be by-passed from the initial stages thereof, 2a.

It will be seen that when the valve 5 is set for the exhaust steam from the reciprocating engine to pass through the turbine to the condenser 3, the ratio of the power developed by the turbine to that developed by the reciprocating engine may be reduced by opening the valve 8 and by-passing an amount of the steam passing through the initial stages 2a of the turbine.

Figure 2:
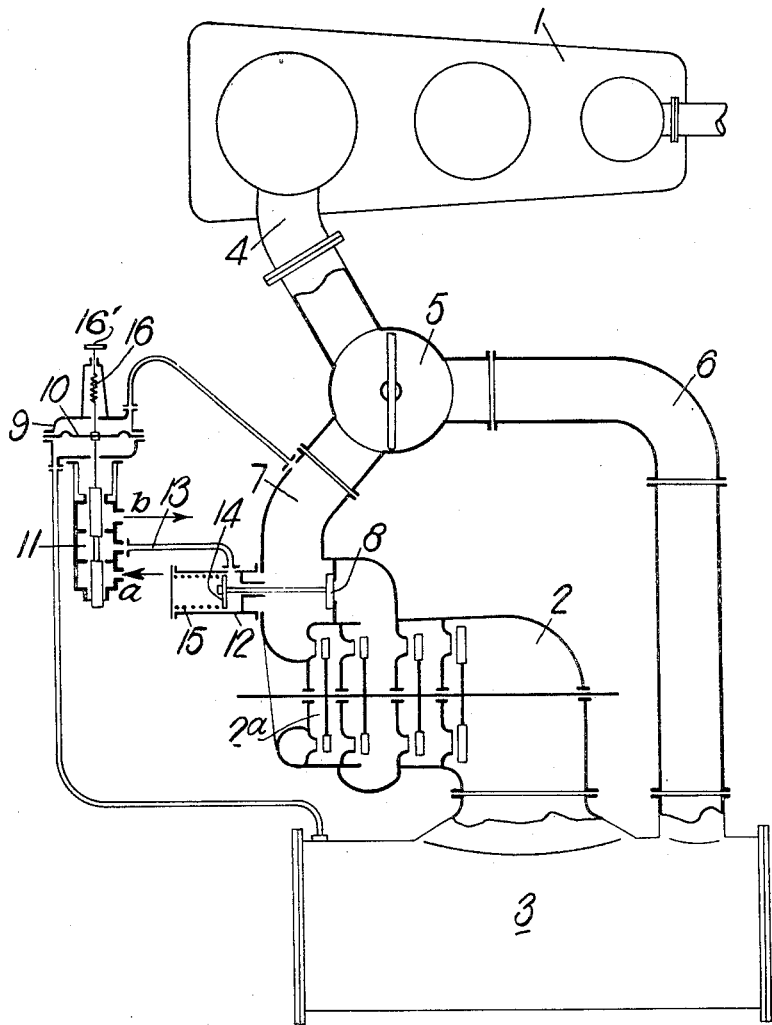
Fig. 2 is a somewhat similar diagram illustrating one method of controlling the valve for by-passing an initial stage of the turbine.

Referring now to Fig. 2 in which similar parts to those shown in Fig. 1 are denoted by the same reference numerals, the by-pass valve 8 is here controlled by differences in pressure of the steam supplied to the turbine and the vacuum in the condenser. 9 is a casing divided into two parts by a sensitive diaphragm 10 which is exposed on its upper surface to the steam pressure in the pipe 7 leading to the turbine, while its under surface is exposed to a vacuum in the condenser 3. The diaphragm 10 is connected to an oil relay valve 11 of a well known type which controls the admission to and exhaust from a pressure cylinder 12 through the pipe 13. In the cylinder 12 is a piston 14 controlled by a spring 15 which actuates the valve 8. The diaphragm 10 is also connected to a spring 16 the tension of which may be controlled by an adjusting screw 16'.

In operation if the pressure in the steam pipe 7 which acts on the upper side of the diaphragm 9 exceeds that in the condenser by a predetermined amount which can be adjusted by adjusting the tension of spring 16, the diaphragm moves downwards operating the relay valve 11 so as to admit actuating fluid from its supply pipe $a$ to the cylinder 12 and open the by-pass valve 8 against the pressure of the spring 15. When the pressure difference between the steam in the inlet to the turbine and the vacuum in the condenser is reduced the diaphragm 9 will rise, operating the relay valve 11 to connect the cylinder 12 to its exhaust pipe $b$ and allow the by-pass valve 8 to close. The power developed by turbine 2 and its ratio to the power developed by engine 1 is thus controlled in response to differences of steam pressure in two portions of the system, the pressure of the steam supplied to it through pipe 7 and the pressure of the steam in condenser 3.

Referring now to Fig. 3, 17 is a thermostat and 18 a relay controlled by said thermostat, which is so arranged as to close the contacts of the relay in the circuit 19 when the temperature measured by the thermostat exceeds a predetermined value. Both the thermostat and the relay may be standard commercial articles of which there are several well known kinds. In the arrangement illustrated the thermostat 17 comprises a bulb, containing expansible gas or liquid, which is connected by a pipe to a pressure responsive device shown as a corrugated bellows by means of which the switch of relay 18 is operated. Included in the circuit 19 is a solenoid 20, the plunger of which is connected by a rod 21 to a relay valve 11 controlling the turbine by-pass valve as already shown and explained with reference to Fig. 2 of the drawings. The circuit 19 is arranged to be supplied with energy from any suitable source.

In operation the thermostat 17 may be arranged to measure the temperature of the cooling water of the condenser or the temperature of the coupling between the turbine and the main shaft. Where the coupling consists of a dynamo electric generator and electric motor the thermostat may, for example, be embedded in the windings of one or other of the machines or may be located in the ventilating air systems of one or other of said machines.

In the arrangement shown in Fig. 3 the turbine 2 is connected to the propeller through the agency of a generator 22 driven thereby and a motor 24 connected to the propeller shaft 25 which is also connected to engine 1. The thermostat 17 is embedded in the windings of the generator 22 and thus responsive to their temperature. Upon a continued overload the windings of generator 22 will become overheated and the thermostat 17 being subjected to this abnormal temperature will operate the switch of relay 18, thereby completing the operating circuit of solenoid 20. Upon operation of solenoid 20 rod 21 connected therewith is moved downwardly operating relay valve 11 to admit actuating fluid from its supply pipe $a$ to the cylinder 12 to open the by-pass valve 8 against the pressure spring 15. The opening of valve 8 will by-pass a certain amount of the steam supplied from engine 1 about the initial stages of the turbine 2 thereby decreasing the power developed by this machine, and the load capacity of generator 22. Upon removal of the overload on the generator 22 the temperature of its windings will decrease, and the thermostat will eventually operate to open the switch of relay 18 thereby deenergizing solenoid 20. When solenoid 20 is deenergized the relay valve 11 is raised thereby connecting cylinder 12 to the exhaust pipe $b$ allowing by-pass valve 8 to close under the influence of spring 15.

In Fig. 4 as in Fig. 3 the exhaust steam turbine is indicated at 2 and is arranged to drive an electric generator 22. The generator supplies current through the circuit 23 to an electric motor 24, which is mechanically connected with the main propeller shaft indicated at 25 which is also mechanically connected to engine 1. 26 is a solenoid arranged to be connected in parallel with a resistance 27, both being included in series in the electric circuit 23. The solenoid 26 is provided with a plunger 28, the movement of which is constrained by a lever 29 pivoted at a fixed point 30 and controlled by a spring 31. The other end of the lever is connected through a rod 32 to any well known type of mechanism for controlling a throttle valve. Such mechanisms are, for example, in regular use between the centrifugal speed governor and the throttle valves of steam turbines and other prime movers. In the present instance the rod 32 is attached to one end of a floating lever 33 through a bell-crank lever 34, the other end of the floating lever 33 being attached to the operating rod 38 of valve 8. The mid-portion of the floating lever 33 is attached to the relay valve 11 through a rod 39.

In operation the solenoid 26 which carries a definite fraction, as determined by the resistance 27, of the main current circulating in the circuit 23 between the generator 22 and the motor 24, exerts a pull on the plunger 28 which is opposed by the spring 31. The various forces are so disposed that when normal full load current is flowing in the circuit 23 the system comprising the plunger 28, lever 29 and spring 31 are in equilibrium in a position which may be described as the neutral position. Any increase in the current flowing in circuit 23 due to overload on electrical machines will then result in clockwise rotation of the lever 29 about the pivot 30 and through the rod 32 will open the by-pass valve of the turbine by an amount depending upon the angle of displacement of the lever 29 from the neutral position which depends on the overload prevailing in the generator and motor circuit.

The operation of the arrangement shown in Fig. 4 is as follows: Upon an overload plunger 28 is drawn into solenoid 26 against the action of spring 31 rotating lever 29 about pivot 30 and elevating rod 32. The upward movement of rod 32 moves the upper end of the floating lever 33 to the right thus displacing the pilot valve 11 in a direction to place cylinder 12 in communication with actuating fluid supplied through pipe $a$. The valve 8 is thus opened against the action of the spring 15. The opening movement of the valve 8 operates through rod 38 to move the lower end of the floating lever 33 to the left, thereby returning pilot valve 11 to its neutral position illustrated in the drawings. The by-pass valve 9 of turbine 28 is thus opened an amount depending upon the angle of displacement of the lever 29 from its neutral position. The amount of displacement depends upon the overload prevailing in the generator and motor load circuit.

It is preferred to connect the solenoid 26 in parallel with the resistance 27 rather than in series with the generator 22 and motor 24 because with the arrangement as shown a given change of current in the main circuit produces a greater change of current in the solenoid due to the fact that the latter change is the direct result of the increase in current in the circuit 23 and of the extra fall in pressure across the resistance 27 consequent upon the greater heating effect of the increased current flowing through said resistance. The consequence of this proportionate increase in current through the solenoid is to impart greater stability to the governing system than would otherwise be the case.

It will be noted that the system described with reference to Fig. 4 has an essential point of difference from that described with reference to Fig. 3, namely, that the extent to which the turbine is by-passed is adjusted to meet the following decrease of potential overload. In the arrangements shown in Fig. 3 only one degree of by-passing is provided, that is to say the valve is either wholly closed or wholly open.

While in the above description a single condenser has been referred to for brevity, it will be apparent that the invention provides arrangements for enabling the ratio of the power developed by the reciprocating engine and the turbine to be varied as desired, which may be applied irrespective of the number of condensers which it may be desired to employ in the plant.

We claim:—

1. A power system comprising a reciprocating engine, a turbine supplied with the exhaust motive fluid of said reciprocating engine, means for connecting said reciprocating engine and said turbine to a common load, and means responsive to an overload on said turbine for reducing the ratio of power developed by said turbine to the power developed by said reciprocating engine.

2. A power system comprising a reciprocating engine, a turbine supplied with the exhaust from said reciprocating engine, means for connecting said reciprocating engine and said turbine to a common load device, and means responsive to the difference in motive fluid pressure in two parts of said system upon an overload on said turbine for reducing the ratio of power developed by said turbine to the power developed by said reciprocating engine.

3. A power system comprising a reciprocating engine, a turbine supplied with the exhaust motive fluid from said reciprocating engine, a load device connected to said reciprocating engine, an electrical coupling between said turbine and said load device, and means responsive to thermal changes in said electrical coupling upon an overload on said turbine for reducing the ratio of power developed by said turbine to the power developed by said reciprocating engine.

4. A power system comprising a reciprocating steam engine, a multistage turbine, means for connecting said reciprocating engine and said turbine to a common load device, means for connecting said turbine to the exhaust of said reciprocating engine, and means responsive to an overload on said turbine for by-passing the exhaust of said reciprocating engine about at least one of the stages of said turbine.

5. A power system comprising a reciprocating engine, a multistage turbine, means for connecting said turbine to the exhaust of said reciprocating engine, a load device driven by said reciprocating engine, an electrical coupling between said load device and said turbine, and means responsive to an overload on said coupling for by-passing the exhaust of said reciprocating engine about at least one of the stages of said turbine.

6. A power system comprising a reciprocating steam engine, a multistage turbine, means for connecting said turbine to the exhaust of said reciprocating engine and to a region of low pressure, a load device driven by said reciprocating engine, an electrical coupling between said load device and said turbine, and means responsive to thermal changes in said electrical coupling for by-passing the exhaust of said reciprocating engine about at least one of the stages of said turbine.

7. A power system comprising a reciprocating engine, a multistage turbine, means for connecting said turbine to the exhaust of said reciprocating engine, a load device driven by said reciprocating engine, an electrical coupling between said load device and said turbine, and means responsive to overload current in said coupling for by-passing the exhaust of said reciprocating engine about at least one of the stages of said turbine.

8. A power system comprising a reciprocating engine, a multistage turbine, means for connecting said turbine to the exhaust of said reciprocating engine, a load device driven by said reciprocating engine, an electrical coupling between said load device and said turbine, and means responsive to the current in said electrical coupling for by-passing the exhaust of said reciprocating engine about at least one of the stages of said turbine in an amount directly proportional to the current in said coupling.

9. A power system comprising a reciprocating engine, a multistage turbine, means for connecting said turbine to the exhaust of said reciprocating engine, an electric motor, a load device driven by said reciprocating engine and said electric motor, a generator driven by said turbine, means for electrically connecting said generator and said motor, and means responsive to a predetermined current flow between said generator and said motor for by-passing the exhaust of said reciprocating engine about at least one of the stages of said turbine.

JAMES WEIR DAVISON.
GERALD WHITEHOUSE HIGGS-WALKER.
ERIC MAURICE JOHNSON.